United States Patent Office 3,402,100
Patented Sept. 17, 1968

3,402,100
EMULSIONS OF FATTY ACIDS AND ACROLEIN POLYMERS AND SIZING PAPER THEREWITH
Sherwin P. Malchick, Park Forest, Ill., assignor to Nalco Chemical Company, Chicago, Ill., a corporation of Delaware
No Drawing. Filed Aug. 24, 1965, Ser. No. 482,236
5 Claims. (Cl. 162—164)

ABSTRACT OF THE DISCLOSURE

Stable aqueous emulsions of liquid fatty acids and water-soluble acrolein polymers are shown to be effective sizing agents for paper.

---

The present invention is directed in general to a novel sizing agent. More particularly, the invention is concerned with a stable emulsion of a liquid fatty acid and an acrolein polymer, which emulsion is useful in achieving superior sizing of paper.

Thousands of tons of paper are treated annually in order to improve resistance of paper products to water. The most common method for achieving this goal is to treat paper with a combination of rosin and alum. The rosin is normally added to the paper at some point after the beater step, after which it is precipitated with alum and the pH of the pulp is adjusted to between 4.0 and 5.0. Best results are normally achieved at a pH ranging from 4.2 to 4.5.

This prior art process of using rosin, however, has some inherent disadvantages which detract from its overall efficiency. The preparation of paper at a pH of approximately 4.5 causes several difficulties which lessen the effectiveness of the process. For one thing, the resulting paper tends to have poor color, and oxidizes upon aging at a much faster rate than does a paper made from a pulp having a pH above about 5.0. Further, formation of pulp having a relatively low pH materially affects machine life, since an acid pH even of 4.5 causes corrosion of the machine wire and other parts of the overall papermaking process equipment. Finally, the use of rosin is known to decrease the tear, burst and tensile strength of paper by weakening fiber to fiber bonds.

Prior art attempts to overcome these objections have resulted in the use of fatty acids as sizing additives, but none of these attempts have been successful to date. The use of fatty acids requires that an emulsion be formed, since fatty acids normally are not easily miscible with water. Once a stable emulsion of a fatty acid is formed, its use has not been successful due either to the wetting effect of the emulsifiers or to the difficulty in retaining the emulsified fatty acid upon the paper fibers.

It would be of great benefit to the art if a sizing agent could be found which could be employed in a paper process whereby paper was sized at pH's of 5.0 or higher using fatty acids.

It is, therefore, an object of this invention to provide a sizing agent which is effective at a pH from 5.0 to 6.5 or higher, and which still achieves good sizing of paper. It is another object of this invention to employ fatty acids as a constituent of this sizing agent. It is a specific object of this invention to provide sizing agents comprising stable emulsions of fatty acids and acrolein polymers.

Another specific object of this invention is to provide a paper process whereby excellent resistance to water is imparted to paper by the use of the above fatty acid-acrolein polymer emulsion.

It has now been discovered that stable emulsions of fatty acids and acrolein polymers may be prepared for use in paper processes, whereby the resultant paper article possesses excellent resistance to water penetration. It has also been discovered that useful stable emulsions of the homopolymer of polyacrolein or other acrolein polymers and liquid fatty acids may be made in which the ratio of polymer to fatty acid is from 20:1 to 1:40.

Broadly defined, the fatty acids which are useful in the invention are those fatty acids having from 12 to 24 carbon atoms, which are liquid at room temperature. Specific examples of fatty acids which may be used are myristoleic acid, palmitoleic acid, oleic acid, linoleic acid, linolenic acid and recinoleic acid. Also useful as fatty acids in this invention are many of the mixed fatty acids, such as distilled coconut fatty acid, red oil fatty acid, vegetable fatty acids such as distilled cottonseed fatty acid, distilled soybean and fractionated soybean fatty acid, tall oil fatty acid, distilled linseed fatty acid and the like. The mixed fatty acids are lower in cost and therefore constitute a preferred species for use in this invention. Also preferred is oleic acid.

The second component of the novel emulsions, the acrolein polymers, may be defined as any polymer which is formed from a monomer mixture containing at least 30% by weight of an acrolein monomer. Preferably at least 50% of the monomer mixture should be acrolein monomers. A preferred acrolein polymer is the homopolymer of acrolein.

The acrolein monomers useful in the invention may be represented by the general formula:

where $R_1$ and $R_2$ may be either hydrogen, lower alkyl radicals or halogen. When the backbone of the aldehyde molecule contains attached thereto an alkyl radical, it is preferred that these radicals contain less than 6 carbon atoms and more preferably 3 carbon atoms or less. Useful alpha-beta-unsaturated aldehydes may be chosen from among acrolein, alpha-methyl acrolein, alpha-ethyl acrolein, alpha-propyl acrolein, alpha-isobutyl acrolein, alpha-amyl acrolein, alpha-n-hexyl acrolein, alpha-bromo acrolein, etc. Other representative aldehyde monomers are crotonaldehyde, alpha-chlorocrotonaldehyde, beta-chlorocrotonaldehyde, alpha-bromocrotonaldehyde, alpha-beta-dichlorocrotonaldehyde, alpha-beta-dimethyl acrolein, alpha-methyl-beta-ethyl acrolein, alpha-methyl-beta-isopropyl acrolein, alpha-ethyl-beta-propyl acrolein, etc. These monomers may be used alone to obtain polymers or they may be copolymerized with one or more other monomers.

Comonomers which are suitable for copolymerization may be broadly defined as any ethylenically unsaturated monomer which will copolymerize with acrolein monomers. Examples of suitable comonomers are acrylamide, acrylic acid, alkyl esters of acrylic acid such as methyl acrylate, etc., and salts of acrylic acid. Likewise, compounds such as maleic acid, and derivatives thereof, such as esters, salts, etc., vinyl sulfonic, and vinyl phosphonic acids, methyl isopropenyl ketone, dimethylamino ethyl methacrylate, diethylmethylene succinate, ethyl vinyl ketone, vinyl acetate, vinyl pyrrolidone, allyl alcohol, sulfonated styrene, vinyl pyridine, and N-allyl amines may be used, as well as other compounds such as aconitic acid, itaconic acid, and the like.

The compound which may be used in making the interpolymers of this invention such as copolymers and terpolymers also include the ethylenically unsaturated carboxylic acids and their anhydrides such as methacrylic acid, crotonic acid, alpha-phenylacrylic acid, alpha-cyclohexacrylic acid, beta-phenylacrylic acid, alpha-chloromaleic acid, tetrahydrophthalic acid, methyl-tetrahydrophthalic acid, chloromaleic acid, 7,9-dodecadienoic acid, 10,12-eicosadienoic acid, cyanoacrylic acid and methoxyacrylic acid.

Other monomers which can be included in the synthesis of acrolein polymers of the invention are styrene, acrylonitrile, methacrylonitrile, N-ethylacrylamide, mono olefins and diolefins, such as ethylene, propylene, butylene, octylene, butadiene, isoprene, and the like.

It is preferred that any comonomer or monomers employed with acrolein comprise no more than 70 mole percent of the polymer and most preferably no more than 50 mole percent.

The monomer or monomers may be polymerized by a wide variety of synthetic techniques including bulk, solution, emulsion, suspension, etc., polymerizations. One preferred method is polymerization by emulsion techniques. In its broadest aspect this procedure involves adding of the monomer or monomers to an aqueous solution containing a catalyst and suitable amount of an emulsifying agent. Preferably, the reaction flask has been previously purged with an inert gas such as nitrogen. Almost any type of known emulsifier may be employed, but preferred are oxyalkylated alkyl phenols, such as the well-known "Triton" materials, ethylene oxide condensates of fatty acid amides such as "Ethomids-15, O-15, and HT-15," as well as "Arlacel 80" and "Span," which are sorbitan monooleates. Other suitable emulsifying agents are sorbitan mono-stearate, sodium dodecyl benzene sulfonate, aluminum stearates, aluminum oleates, etc. Only minute amounts of emulsifiers are necessary, say from about 10 to about 1000 p.p.m. The concentration of the active monomer ingredients in the reaction mixture may be as low as about 1.0% and as highly concentrated as an emulsion containing 50.0% monomer. The reaction itself may be run in the presence of air, but it is preferred that the reaction vessel be first purged with an inert gas such as nitrogen, carbon dioxide, etc., in order to rid the system of oxygen having somewhat of a tendency to inhibit polymerization and provide lower product molecular weight.

The catalysts that are employed in the process include conventional peroxidic oxidizing agents such as potassium persulfate, hydrogen peroxide, and ammonium persulfate. It is preferred that water-soluble compounds be used for this purpose. The amount of catalyst used in the process can vary from 0.003% to about 0.2% by weight based on the weight of the monomers. The preferred range is from about 0.003% to about 0.05%. In a preferred embodiment, the polymerization action is carried out using a redox type catalytic system. In this method it is particularly preferred to remove oxygen from the system and introduce an inert gas therein in order to permit the catalyst to form free radicals. In a redox system, the catalyst is activated by means of reducing agent which, in the absence of oxygen, immediately produces free radicals without the use of heat. One of the reducing agents most commonly used is sodium metabisulfite. Other suitable agents include water-soluble thiosulfates, hydrosulfites and reducing salts, such as the sulfates of metals which are capable of existing in more than one valence state. The metals include cobalt, iron, nickel and copper. Another excellent reducing agent is silver nitrate. The use of a redox initiator system has several advantages, the most important of which is that it is possible to carry out the polymerization at lower temperatures since it is not required to decompose the catalyst. The catalyst and the activator may, if desired, be dissolved in a small amount of water and then added to the reaction mixture containing the emulsified monomers. Also, the catalyst initiator may be added directly to the emulsion and dissolved therein with mild agitation.

The polymerization itself is carried out at rather low temperatures, and preferably below about 80° C. More preferably, the reaction is carried out at a temperature range of 20–60° C., for a period of time of at least one hour. Excellent polymers have been formed in from about 1 to about 3 hours reaction time.

The products formed in the process described above, generally gel and become completely water-insoluble. However, these products may be reacted with an aqueous solution of an alkali metal bisulfite of ammonium bisulfite or an aqueous solution of sulfur dioxide wherein water-soluble derivatives are obtained. It is preferred therefore that the acrolein polymers of this invention be solubilized by use of the above solubilizing agents.

One simple technique for preparing these water-soluble derivatives is to simply add the solid copolymer, or reaction mixtures thereof, to a dilute aqueous solution of alkali metal or ammonium bisulfite or aqueous $SO_2$ solution. With mild heat, the copolymer is easily reacted to form the water-soluble derivative thereof.

The formation of the emulsions of this invention may be carried out via a variety of methods. However, it has been found convenient to employ the following general method for their preparation. The acrolein polymer is first dissolved in water, by reaction of the polymer with a bisulfite salt or sulfur dioxide. Additional water is added, if necessary, until the desired concentration of polymer is realized. To this aqueous solution of polymer, the fatty acid is added with sufficient agitation to maintain a dispersion. The dispersed mixture of acrolein polymer and fatty acid in water is then homogenized or otherwise intimately mixed until a stable emulsion is formed.

Broadly, the range of acrolein polymer to fatty acid may range between 20:1 and 1:40. It is preferred to limit the above ratio to 1:1 to 1:20. A major portion of the emulsion will be water, with a minor portion of total solids consisting of the fatty acid and the acrolein polymer in the proportions set forth above. Generally it is preferred to employ from 50% to about 99% by weight of water, and from 1% to about 50% by weight of the solids portion. A more preferred range of solids is 20% to 40% by weight solids, with the balance being water. Due to the natural acidity of the acrolein polymer and the fatty acid, the pH of the emulsion ranges normally from about 3.0 to about 6.5. Care should be taken to prevent the pH from going below about 2.0, since the sulfur dioxide or bisulfite groups may be stripped off at this low pH, resulting in poor stability of the emulsion. It is also essential to maintain a pH below about 7.0 since above this point the acrolein polymer will generally precipitate.

EXAMPLE I

The following preparation of a typical emulsion of this invention is set forth in this example.

To a two-liter beaker, fitted with a stirring device, was added 760 grams of water. To this water, 20 grams of a homopolymer of acrolein and 20 grams of sodium bisulfite were added. Upon application of a slight amount of heat, the polymer dissolved in the bisulfite solution and a clear liquid solution of acrolein polymer resulted. Following this, 200 grams of oleic acid were blended with agitation to form a dispersion of the fatty acid in the acrolein polymer. The dispersion was then put through a homogenizer at 2500 p.s.i. The resulting emulsion was stable for over two months without a decrease in activity. The ratio of polymer to fatty acid was 1:10, the total solids concentration was 24% by weight, and the pH of the emulsion was about 3.5.

The process of this invention, as outlined below, may be practiced upon a wide variety of pulps. Pulps, such as groundwood, unbleached kraft, unbleached sulfite, unbleached Mitscherlich, semi-bleached kraft, bleached sulfite, alphasulfite, rag, unbleached softwood, bleached hardwood, sulfide pulp, or any pulp derived from a mechanical, chemical or semi-chemical process may be treated with the emulsions of this invention.

The emulsions may be added to the pulp either directly as a reaction solution or as further diluted solutions, and either via batch or continuous addition. The required amount of treating agent may be added by gravity flow or by means of pumps, preferably, with some kind of metering guide. Flow rates for the diluted treating solutions may be controlled with rotometers or other suitable flow measuring devices, such as orifices and weirs. Likewise the emulsion may be supplied to the pulp in controlled amounts by means of reciprocating, proportioning or gear metering pumps.

The emulsion should preferably be added to the paper stock prior to the sheet formation, that is, added to the "slush" stock at any point from the beater to the headbox or cylinder vat.

The particular steps of the process may be outlined as thus. The first step in the process consists of the addition to the paper pulp of an amount of alum or other aluminum ion source. Generally from 0.1% to 10% of an aluminum ion source, calculated as alum and based on the bone-dry weight of the fibers will be sufficient for the purposes of this invention. A more preferred range of alum is between 0.5% and 5% based on the bone-dry weight of the fibers. The second step in the process of this invention is the addition of sufficient acid or base to adjust the pH to a range of from 5.0 to 6.9. Normally the addition of alum in the previous step will lower the pH of the system so as to require that a minor amount of base such as sodium hydroxide be added to raise the pH to above 5.0. A preferred adjusted pH range is from 5.5 to 6.5. Once the pH has been adjusted, the desired amount of the emulsion is added and the pulp is thereafter formed into paper. It has been found necessary to add at least 0.1% emulsion based on the bone-dry weight of the pulp of the emulsion. The more preferred range of addition is from 0.25% to 2.0% of the emulsion.

The following examples are presented to illustrate the efficiency of the invention. In all cases the test used for evaluating the ability of the sizing agent to hold out water was the Cobb sizing test, TAPPI Standard T-441 M-60. In this test, a low number indicates that little water was absorbed by the paper, while a high value shows high water absorption. A Cobb test number of less than 30 is considered good by industry standards.

EXAMPLE II

This example shows the surprising effectiveness as a sizing agent of the compound of Example I in comparison with other emulsified fatty acids. In each case, the additive was applied to bleached sulfite pulp using the process of the invention as described above. In Run A, the fatty acid of Example I was added without the benefit of an emulsion. In Run B, an emulsion was prepared using an oxyalkylated alkyl phenol as an emulsifier in place of the acrolein polymer of the invention. In Run C, a nonylphenyl polyethylene glycol ether was used as the emulsifier in preparing a fatty acid emulsion. In Run D, the product of Example I was used. In each case ½% total solids was added to the pulp according to the practices of this invention, with 2% alum being used. The pH of the pulp was adjusted to 5.5 prior to addition of the additive with sodium hydroxide.

TABLE I.—EFFECT OF EMULSIFIERS ON SIZING

Run No.: Cobb No.
A _____ 77
B _____ 158
C _____ 162
D _____ 25

As can be seen from the results in Table I above, a surprising superiority in water hold-out is seen when the product of this invention is used as a sizing agent. The extremely poor showing in Runs B and C may be attributed to the fact that the emulsifying agent, although effective in forming an emulsion, destroyed the water hold-out abilities of the fatty acid and acted, in fact, as a wetting agent.

EXAMPLE III

A comparison was made between conventional rosin sizing and the process of this invention. As can be seen from the results of Table II, the amount of sizing agent required for the rosin process was substantially higher than that required by the process of the invention. Runs A, B, and C of Table II were made using rosin size added to the paper pulp, and precipitated with 4% alum. The pH was then adjusted to 4.3, which has been found to be the optimum pH for using alum and rosin as a sizing agent. Runs D, E, and F were made using the process of this invention, wherein 2.5% alum was added to the paper pulp, the pH was adjusted to 5.5, and the emulsion of Example I was added.

TABLE II.—COMPARISON OF ROSIN AND ACROLEIN POLYMER-FATTY ACID EMULSION

| Run | Sizing Agent | Weight Percent Additive Based on Bone-Dry Pulp | Cobb No. |
|---|---|---|---|
| A | Rosin | 0.50 | 40 |
| B | do | 1.0 | 34 |
| C | do | 2.0 | 28 |
| D | F.A. Emulsion | 0.16 | 40 |
| E | do | 0.25 | 36 |
| F | do | 0.50 | 25 |

It is clearly evident from the above table that the process of this invention, using the novel acrolein polymer-fatty acid emulsion as a sizing agent is clearly superior to the prior art process. The use of rosin at a pH of 5.5 to 6.5 is significantly less effective than that shown at the pH of 4.3 in Table II above. The process of this invention enables papermaking processes to utilize a higher pH, therefore preventing loss of strength upon aging and discoloration as is normally encountered with the rosin size. The machine life is increased due to the higher (more neutral) pH. Increased brightness is noticeable due to the low dosage level required to achieve satisfactory size. Tear, burst, and tensile strength levels are not decreased nearly as much due to the relatively low level of additive required.

Having thus described my invention, I claim:

1. A stable aqueous emulsion, useful in sizing paper, comprising from 60 to 80% by weight of water and of from 20 to 40% by weight at least one water-soluble acrolein polymer and a liquid fatty acid having from 12 to 24 carbon atoms, where the ratio of polymer to fatty acid ranges from 20:1 to 1:40.

2. The emulsion of claim 1 where the polymer is a reaction product of an acrolein homo polymer and a reactant selected from the group consisting of sulfur dioxide, alkali metal bisulfite and ammonium bisulfite.

3. A process for manufacturing paper which comprises adding to an aqueous suspension of paper pulp fibers from 0.1% to 10% of an aluminum ion source, calculated as aluminum sulfate and based on the bone-dry weight of said fibers, adjusting the pH to a range of from 5.0 to 6.9, adding at least 0.1% based on the bone-dry weight of said fibers, of a stable aqueous emulsion comprising from 60 to 80% by weight of water and from 20 to 40% by weight of at least one water-soluble acrolein polymer and a liquid fatty acid having from 12 to 24 carbon atoms, where the ratio of polymer to fatty acid ranges from 20:1 to 1:40, and thereafter forming said aqueous pulp suspension into paper, whereby said paper has improved resistance to water.

4. The process of claim 3 where the polymer is a reaction product of an acrolein homo polymer and a reactant selected from the group consisting of sulfur dioxide, alkali metal bisulfide and ammonium bisulfide.

5. The process of claim 3 where the ratio ranges from 1:1 to 1:20.

References Cited

UNITED STATES PATENTS 2,819,252  1/1958  Shokal _____ 260—23 X
3,079,296  2/1963  Houff et al. _____ 162—168

S. LEON BASHORE, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,100                                                      September 17, 1968

Sherwin P. Malchick

It is certified that error appears in the above identified patent and that said Letters Patent are hereby corrected as shown below:

Column 4, line 3, "bisulfite of" should read -- bisulfite or --.

Signed and sealed this 21st day of April 1970.

(SEAL)
Attest:

Edward M. Fletcher, Jr.                                  WILLIAM E. SCHUYLER, JR.
Attesting Officer                                                      Commissioner of Patents